United States Patent [19]

Asakura et al.

[11] 4,324,485

[45] Apr. 13, 1982

[54] ELECTROSTATIC COPYING APPARATUS

[75] Inventors: Kouichi Asakura; Toyoo Okamoto, both of Tokyo, Japan

[73] Assignee: Ricoh Company, Ltd., Tokyo, Japan

[21] Appl. No.: 87,902

[22] Filed: Oct. 24, 1979

[30] Foreign Application Priority Data

Nov. 20, 1978 [JP] Japan ................................ 53-142253

[51] Int. Cl.[3] ........................ G03G 15/28; G03B 27/72

[52] U.S. Cl. ...................................... 355/8; 355/14 E; 355/69

[58] Field of Search .............. 355/3 R, 8, 14 R, 14 E, 355/69

[56] References Cited

U.S. PATENT DOCUMENTS

| | | | |
|---|---|---|---|
| 3,689,143 | 9/1972 | Case et al. | 355/8 X |
| 4,116,562 | 9/1978 | Libby et al. | 355/3 X |
| 4,118,117 | 10/1978 | Koizumi et al. | 355/8 |
| 4,159,173 | 6/1979 | Kasuga | 355/8 |
| 4,183,656 | 1/1980 | Ishihara et al. | 355/8 |
| 4,183,660 | 1/1980 | Bujese | 355/8 X |

*Primary Examiner*—Fred L. Braun
*Attorney, Agent, or Firm*—David G. Alexander

[57] ABSTRACT

In a reciprocating scan system, movement is stopped for a predetermined length of time between a scan stroke and a return stroke to prevent erroneous imaging of a photoconductive drum (12) which would result in unnecessary loading of a cleaning unit (26) and formation of a partial reversed image in addition to a desired image on a copy sheet (23). Control circuitry (61) may be provided to cause the stopping operation only when the magnification is less than unity or when the length of the copy sheet (23) in the scan direction is longer than the corresponding image length.

7 Claims, 7 Drawing Figures

ELECTROSTATIC COPYING APPARATUS

BACKGROUND OF THE INVENTION

The present invention relates to an improved electrostatic copying machine comprising a reciprocating scanning mechanism.

An electrostatic copying machine of the present type comprises a document supporting platen and a scan unit having a light source and scanning element such as a mirror. Either the platen or the scan unit is reciprocated relative to the other in a scan stroke and a return stroke.

In order to ensure that the trailing edge of the original document in the scan direction is illuminated with the same intensity as the remainder of the document, the light source is energized for a certain period of time after the scan stroke is finished and the return stroke has begun. This results in a portion of a photoconductive drum being imaged with not only the desired image of the document but also a partial reversed image due to energization of the light source during the first part of the return stroke. This partial reversed image must be removed by a drum cleaning unit and may overload the cleaning unit if the partial reversed image contains a large proportion of dark areas. Where the length of the image in the scan direction is smaller than the length of a copy sheet and the return stroke is begun as soon as the trailing edge of the document has been scanned, the partial reversed image will be transferred onto the copy sheet. Both of these problems which have existed heretofore in the prior art are undesirable and arise from the same cause.

SUMMARY OF THE INVENTION

An electrostatic copying apparatus embodying the present invention includes a document support platen, document scan means and scan drive means for producing reciprocating relative movement between the platen and the scan means including a scan stroke and a return stroke, and is characterized by comprising control means for energizing the scan drive means to perform the scan stroke, de-energizing the scan drive means for a predetermined length of time and then energizing the scan drive means to perform the return stroke.

In a reciprocating scan system, movement is stopped for a predetermined length of time between a scan stroke and a return stroke to prevent erroneous imaging of a photoconductive drum which would result in unnecessary loading of a cleaning unit and formation of a partial reversed image in addition to a desired image on a copy sheet. Control circuitry may be provided to cause the stopping operation only when the magnification is less than unity or when the length of the copy sheet in the scan direction is longer than the corresponding image length.

It is an object of the present invention to provide an electrostatic copying apparatus comprising a reciprocating scan system which prevents the formation of a partial reversed image on a photoconductive drum.

It is another object of the present invention to provide an electrostatic copying apparatus which prevents overloading of a cleaning unit which would result from the necessity of removing a partial reversed image from a drum.

It is another object of the present invention to prevent the formation of a partial reversed image on a copy sheet in cases where the image length in the scan direction is shorter than the copy sheet length.

It is another object of the present invention to provide a generally improved electrostatic copying apparatus comprising a reciprocating scan system.

Other objects, together with the foregoing, are attained in the embodiments described in the following description and illustrated in the accompanying drawing.

DESCRIPTION OF THE PREFERRED EMBODIMENTS

While the electrostatic copying apparatus of the present invention is susceptible of numerous physical embodiments, depending upon the environment and requirements of use, substantial numbers of the herein shown and described embodiments have been made, tested and used, and all have performed in an eminently satisfactory manner.

Figure 7:
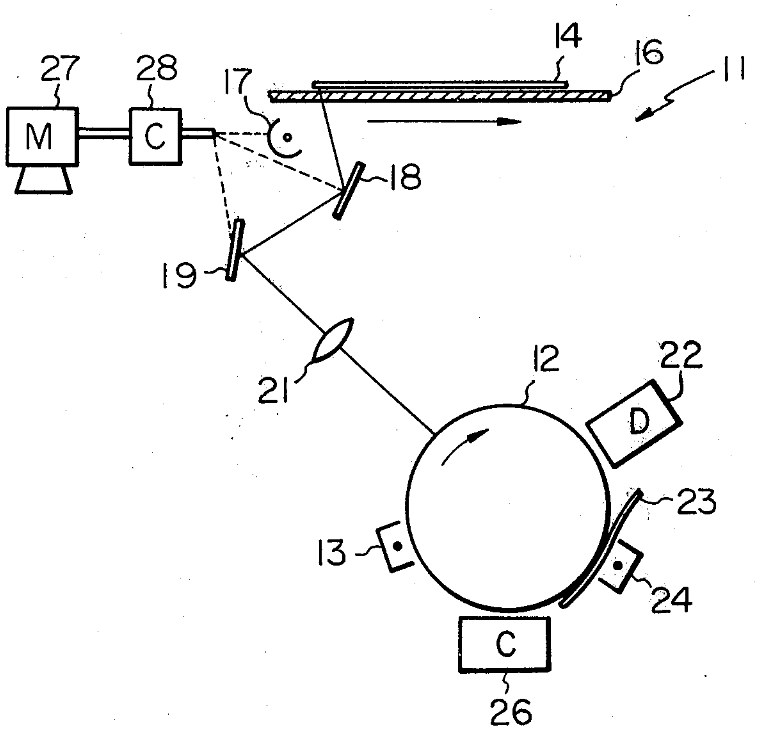
FIG. 7 is a schematic diagram of the present invention.

Referring now to FIG. 7 of the drawing, an electrostatic copying apparatus embodying the present invention is generally designated by the reference numeral 11 and comprises a photoconductive drum 12 which is driven clockwise at constant speed. The drum 12 is initially uniformly charged in the dark by a corona charging unit 13.

An original document 14 is placed face down on a transparent glass platen 16 and illuminated from below by a light source 17. More specifically, the light source 17 illuminates a linear portion of the document 14, a light image of which is reflected from a mirror 18 to a mirror 19 and reflected from the mirror 19 through a converging lens 21 onto the drum 12 in a focussed manner. The mirror 18 and light source 17 are moved rightwardly in a scan stroke at the same surface speed as the drum 12 for unity magnification. The mirror 19 is also moved rightwardly during the scan stroke but at one-half the surface speed of the drum 12. After the entire document 14 has been scanned, the light source 17 and mirrors 18 and 19 are moved leftwardly back to their original positions in a return stroke.

The light image of the document 14 causes localized photoconduction and the formation of an electrostatic image on the drum 12. The electrostatic image is developed through application of toner by a developing unit 22. The resulting toner image is transferred to a copy sheet 23 by a transfer charger 24 and fixed thereto to provide a permanent copy. Any residual toner is removed from the drum 12 and the drum 12 discharged by a cleaning unit 26.

The light source 17 and mirrors 18 and 19 are reciprocatingly driven in the manner described above by a scan drive motor 27 through a clutch unit 28.

Figure 1:
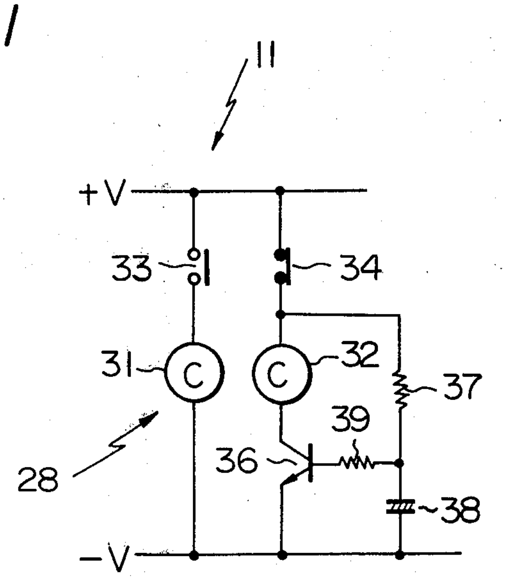
FIG. 1 is an electrical schematic diagram of a first embodiment of the present invention.

Referring now to FIG. 1, the clutch unit 28 comprises a forward clutch 31 and a reverse clutch 32 which, when energized, cause the light source 17 and mirrors 18 and 19 to perform the scan stroke and the return stroke respectively. A reverse gear arrangement connected between the motor 27 and the clutch 32 is not illustrated since such is well known in the art.

The clutches 31 and 32 are electromagnetically actuated and engage in response to applied voltage. The clutch 31 is connected in series with relay contacts 33 between a positive D.C. source +V and a negative D.C. source −V. The clutch 32 is connected in series with relay contacts 34 and the collector circuit of an NPN transistor 36, with the emitter of the transistor 36 being connected to the source −V. The contacts 33 and 34 are ganged together such when one of the contacts 33 and 34 is engaged the other is disengaged.

An RC timer circuit comprising a resistor 37 and a capacitor 38 is connected between the junction of the contacts 34 and clutch 32 and the source −V. The junction of the resistor 37 and capacitor 38 is connected to the base of the transistor 36 through a resistor 39.

The contacts 33 are closed and the contacts 34 are opened initially to energize the scan elements to perform the scan stroke. After the entire document 14 has been scanned, the contacts 33 are opened and the contacts 34 are closed to energize the scan elements to perform the return stroke. However, the voltage across the capacitor 38 is initially zero and the transistor 36 is thereby turned off. Thus, even though the contacts 34 are closed, the scan system is de-energized.

The capacitor 38 charges at a rate depending on the time constant of the resistor 37 and capacitor 38 in combination. When the voltage across the capacitor 38 reaches a predetermined level, the transistor 36 is turned on and allows current flow through the clutch 32. Thus enables the scan system to be energized for the return stroke.

Figure 2:
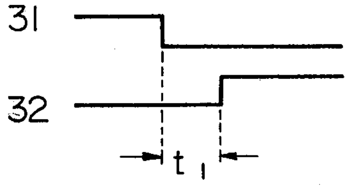
FIG. 2 is a timing diagram illustrating the operation of the embodiment of FIG. 1.

As shown in FIG. 2, the length of time required for the capacitor 38 to reach the predetermined value is equal to a predetermined length of time t1. As mentioned above, the lamp 17 is energized longer than the scan stroke to ensure that the right edge portion of the document 14 is sufficiently illuminated. The length of time t1 is selected to be long enough to ensure that the lamp 17 is de-energized before starting the return stroke. This positively prevents the formation of a partial reverse image on the drum. The charging unit 13 is preferably shut off at the same time as the lamp 17.

It will be noted that with both clutches 31 and 32 disengaged, no driving power is transmitted from the motor 27 to the scanning system which comprises the lamp 17 and mirrors 18 and 19. The system may be designed so that when the clutches 31 and 32 are disengaged, the scanning system will continue movement due to mechanical inertia. Alternatively, the system may be designed to stop as soon as the clutch 31 is disengaged. In the latter case, a brake (not shown) may be provided to stop the scanning system when both clutches 31 and 32 are disengaged.

Figure 3:
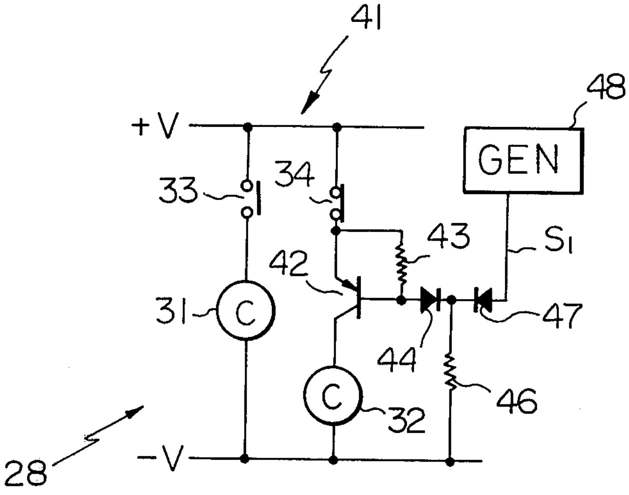
FIG. 3 is an electrical schematic diagram of a second embodiment of the present invention.
Figure 4:
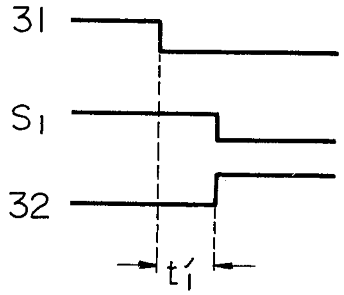
FIG. 4 is a timing diagram illustrating the operation of the embodiment of FIG. 3.

A second embodiment of the present invention is illustrated in FIG. 3 in which like elements are designated by the same reference numerals. In an apparatus 41, the collector circuit of a PNP transistor 42 is connected in series with the clutch 32 and contacts 34. The emitter of the transistor 42 is connected to the contacts 34 and also to the base of the transistor 42 through a resistor 43. The base of the transistor 42 is also connected to the anode of a diode 44, the cathode of which is connected to the source −V through a resistor 46. The cathode of the diode 44 is also connected to the cathode of a diode 47, the anode of which is connected to the output of an illumination signal generator 48.

The illumination signal generator 48 generates a logically high illumination signal S1 which is applied to a switch circuit (not shown) to cause the lamp 17 to be energized for scanning. The signal S1 is also applied to the anode of the diode 47 and thereby to the junction of the diode 44 and resistor 46. The high signal S1 reverse biases the diode 44 and prevents the transistor 42 from being turned on.

The signal S1 goes logically low after a time t1' has elapsed after the clutch 31 is disengaged. The logically low signal S1 reverse biases the diode 47 and effectively disconnects it from the circuit. The base of the transistor 42 is thereby connected to the source −V through the forward biased diode 44 and resistor 46. The low base voltage of the transistor 42 turns on the transistor 42 which passes current through the clutch 32 to engage the same and initiate the return stroke.

The time period t1' is typically equal to the time period t1 and provides a delay between termination of the scan stroke and initiation of the return stroke as in the first embodiment. In summary, the return stroke is delayed until the lamp 17 is turned off.

In unity magnification copying, it may not be desirable to delay the return stroke of the scanning system since it is not possible to produce a partial reversed image on the copy sheet 23. This is because the length of the copy sheet 23 is equal to the length of the image, and any partial reverse image would not be transferred to the copy sheet 23, although it would have to be removed from the drum 12 by the cleaning unit 26. Eliminating the delay speeds up the copying operation. Regardless of whether the scan stroke is varied to correspond to the copy sheet size or whether it is always maintained in accordance with a maximum copy sheet size, a partial reversed image cannot be transferred to the copy sheet in basic unity magnification copying.

Figure 5:
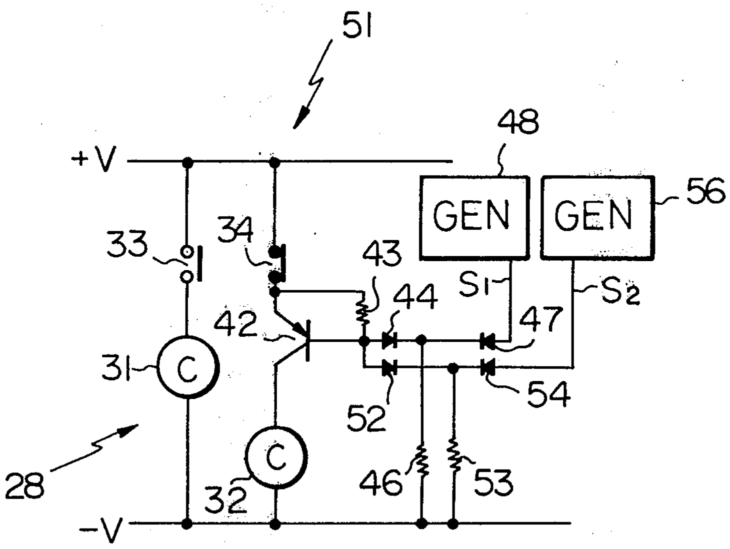
FIG. 5 is an electrical schematic diagram of a third embodiment of the present invention.

FIG. 5 illustrates another apparatus 51 comprising means for inhibiting the delay t1' when the magnification is unity. In addition to the components of FIG. 3, the apparatus 51 comprises a diode 52 having its anode connected to the anode of the diode 44 and a cathode connected to the source −V through a resistor 53. The cathode of the diode 52 is also connected to the cathode of a diode 54, the anode of which is connected to the output of a magnification signal generator 56.

The combination of the diodes 52 and 54 with the resistor 53 functions in the same manner as the combination of the diodes 44 and 47 with the resistor 46, and all these elements in combination with the transistor 42 and resistor 43 constitute a NAND gate. The generator 56 produces a logically low signal S2 when the copying magnification is unity and a logically high signal S2 at other magnifications. Typically, the copying apparatus 11 is capable of unity magnification copying and reduced magnification copying at one or more reduced magnifications.

The signal S2, when logically high, forward biases the diode 54 and which reverse biases the diode 52. As long as the signal S1 is high, the transistor 42 will be turned off. However, when the signal S2 is low, the diode 54 will be reverse biased and the diode 52 will be forward biased. Thus, the base of the transistor 42 will be connected to the source −V through the diode 52 and the resistor 53 and thereby turned on. Even if the signal S1 is high, the transistor 42 will be turned on by the low signal S2. In summary, the transistor 42 is turned on and the clutch 32 engaged to enable the return stroke of the scan system when either signal S1 or S2 is logically low. In this manner, the apparatus 51 is inhibited from providing the delay t1' at unity magnification.

Figure 6:
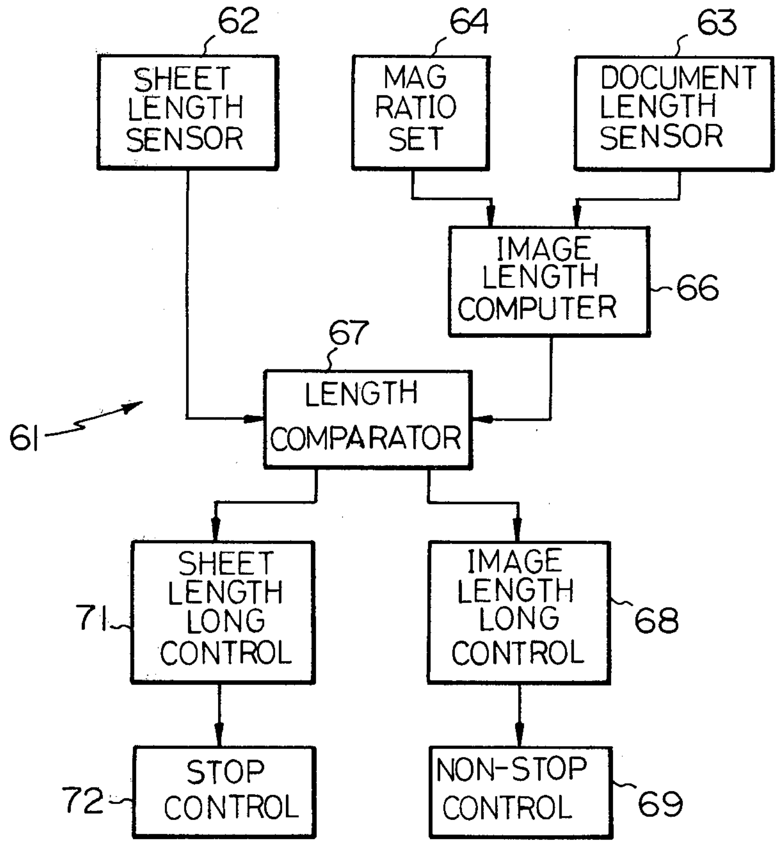
FIG. 6 is a block diagram of a fourth embodiment of the present invention.

Actually, transfer of a partial reversed image to the copy sheet 23 is only possible when the length of the copy sheet 23 in the scan direction is larger than the length of the image and the return stroke is begun as soon as the far or trailing edge (the right edge in FIG. 7) of the document 14 is reached. Electrostatic copying machines have been developed which operate in this manner by sensing the length of the document 14 photoelectrically or otherwise. Alternatively, the length or size of the document may be input by means of a switch. At any rate, copying with this type of copying machine is very fast since there is no wasted movement of the scanning system. Typically, such copying machines incorporate microcomputers for controlling the operation thereof while monitoring various conditions. FIG. 6 illustrates, in block form, such a copying machine or apparatus incorporating the present invention.

A copying apparatus as illustrated in FIG. 6 is generally designated as 61 and comprises a sheet length sensor 62 for sensing the length of the copy sheet 23. The sensor 62 typically comprises microswitches which sense coded depressions in a sheet cassette indicating the sheet size, although not illustrated.

The apparatus 61 further comprises a document length sensor 63 which comprises photosensors or the like as discussed above which senses the length of the document 14 on the platen 16 in the scan direction. A magnification ratio set unit 64 produces an output indicating the magnification ratio. An image length computer 66 multiplies the document length by the magnification ratio to produce the length of the light image in the scan direction.

A length comparator 67 compares the document length with the image length and energizes an image length long control unit 68 when the image length is equal to or larger than the sheet length. The unit 68 feeds an output signal to a non-stop control unit 69 to control the apparatus 61 to inhibit the delay t1 or t1'.

When the sheet length is larger than the image length, the comparator 67 energizes a sheet length long control unit 71 which feeds an output signal to a stop control unit 72 to control the apparatus 61 to provide the delay t1 or t1'. For example, if the document size is A3 and the magnification is 1:0.669, the image will be reduced to A4 size. If the copy sheet size is A4, the delay or stop operation between the scan stroke and the return stroke will not be performed. However, if the sheet size is A3, the delay operation will be performed to prevent the transfer of a partial reversed image to the copy sheet 23.

In summary, it will be seen that the present invention provides an electrostatic copying apparatus which eliminates the problems involved in the formation of a partial reversed image on a photoconductive drum, belt or the like in a reciprocating scan system. Various modifications will become possible for those skilled in the art after receiving the teachings of the present disclosure without departing from the scope thereof. For example, the present invention applies to scan drive systems comprising reversing motors, chains and the like as well as to the particular system described and illustrated.

What is claimed is:

1. An electrostatic copying apparatus including a document support platen, document scan means and scan drive means for producing reciprocating relative movement between the platen and the scan means including a scan stroke and a return stroke, characterized by comprising:

control means for energizing the scan drive means to perform the scan stroke, then de-energizing the scan drive means for a predetermined length of time and then energizing the scan drive means to perform the return stroke;

the scan means comprising a document illumination light source, the control means energizing the light source when energizing the scan drive means to perform the scan stroke and de-energizing the light source after substantially the predetermined length of time has elapsed after termination of the scan stroke.

2. An apparatus as in claim 1, in which the platen, scan means and scan drive means are constructed in such a manner that relative movement between the platen and scan means is stopped while the scan drive means is de-energized.

3. An apparatus as in claim 1, in which the platen, scan means and scan drive means are constructed in such a manner that relative movement between the platen and scan means continues due to inertia while the scan drive means is de-energized.

4. An apparatus as in claim 1, in which the control means comprises timer means for timing the predetermined length of time.

5. An electrostatic copying apparatus including a document support platen, document scan means and scan drive means for producing reciprocating relative movement between the platen and the scan means including a scan stroke and a return stroke, characterized by comprising:

control means for energizing the scan drive means to perform the scan stroke, then de-energizing the scan drive means for a predetermined length of time and then energizing the scan drive means to perform the return stroke;

the scan means comprising a document illumination light source, the control means energizing the light source when energizing the scan drive means to perform the scan stroke and de-energizing the light source after termination of the scan stroke by the predetermined length of time;

the control means comprising signal generator means for producing an illumination signal, the light source being energized in response to the illumination signal, the control means further comprising switch means for inhibiting energization of the scan drive means to perform the return stroke in response to the illumination signal.

6. An electrostatic copying apparatus including a document support platen, document scan means and scan drive means for producing reciprocating relative movement between the platen and the scan means including a scan stroke and a return stroke, characterized by comprising:

control means for energizing the scan drive means to perform the scan stroke, then de-energizing the scan drive means for a predetermined length of time and then energizing the scan drive means to perform the return stroke;

said apparatus being further constructed to selectively copy at unity magnification and at reduced magnification, the control means being further constructed to energize the scan drive means to perform the return stroke immediately after termination of the scan stroke only when the apparatus is copying at the unity magnification.

7. An electrostatic copying apparatus including a document support platen, document scan means and scan drive means for producing reciprocating relative movement between the platen and the scan means including a scan stroke and a return stroke, characterized by comprising:

control means for energizing the scan drive means to perform the scan stroke, then de-energizing the scan drive means for a predetermined length of time and then energizing the scan drive means to perform the return stroke;

the control means comprising means for sensing a document length in a scan direction, means for sensing a copy sheet length in the scan direction, means for sensing a copying magnification, means for computing an image length in the scan direction in accordance with the document length and magnification, means for comparing the image length with the copy sheet length and means for energizing the scan drive means to perform the return stroke immediately after termination of the scan stroke only when the image length is equal to or larger than the sheet length.

* * * * *